(12) United States Patent
Hanlon et al.

(10) Patent No.: US 9,056,668 B2
(45) Date of Patent: Jun. 16, 2015

(54) AIRCRAFT CONTROL STICK OPERATIONAL IN ACTIVE AND PASSIVE MODES

(75) Inventors: Casey Hanlon, Queen Creek, AZ (US); Steve Abel, Chandler, AZ (US); Donald Jeffrey Christensen, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 386 days.

(21) Appl. No.: 13/547,386

(22) Filed: Jul. 12, 2012

(65) Prior Publication Data

US 2014/0014781 A1    Jan. 16, 2014

(51) Int. Cl.
   B64C 13/04    (2006.01)
(52) U.S. Cl.
   CPC .................................... B64C 13/04 (2013.01)
(58) Field of Classification Search
   USPC ............... 244/234, 237, 235, 236, 220, 225; 74/471 R
   See application file for complete search history.

(56) References Cited

U.S. PATENT DOCUMENTS

| | | | |
|---|---|---|---|
| 3,299,731 A * | 1/1967 | Russell, Jr. ................... | 74/471 R |
| 3,394,611 A * | 7/1968 | Beurrier ....................... | 74/471 R |
| 4,273,972 A | 6/1981 | Butterworth | |
| 4,473,203 A * | 9/1984 | Barnoin et al. .............. | 244/224 |
| 4,489,304 A | 12/1984 | Hayes | |
| 4,490,710 A | 12/1984 | Kopsho, Jr. et al. | |
| 4,620,176 A | 10/1986 | Hayes | |
| 4,642,774 A | 2/1987 | Centala et al. | |
| 4,645,141 A | 2/1987 | McElreath | |
| 4,733,214 A | 3/1988 | Andresen | |
| 4,857,881 A * | 8/1989 | Hayes ........................... | 338/128 |
| 4,861,269 A * | 8/1989 | Meenen, Jr. .................. | 434/45 |
| 5,107,080 A * | 4/1992 | Rosen ........................... | 200/6 A |
| 5,142,931 A * | 9/1992 | Menahem ................. | 74/471 XY |
| 5,724,068 A * | 3/1998 | Sanchez et al. .............. | 345/161 |
| 5,790,101 A | 8/1998 | Schoch et al. | |
| 5,820,071 A * | 10/1998 | Cross .......................... | 244/17.13 |
| 6,104,382 A * | 8/2000 | Martin et al. ................. | 345/161 |
| 6,405,432 B1 * | 6/2002 | Sedor et al. ..................... | 29/854 |
| RE42,183 E | 3/2011 | Culver | |
| 2012/0025031 A1 | 2/2012 | Stachniak et al. | |

FOREIGN PATENT DOCUMENTS

GB         662856 A      12/1951

* cited by examiner

*Primary Examiner* — Christopher P Ellis
(74) *Attorney, Agent, or Firm* — Ingrassia Fisher & Lorenz, P.C.

(57) ABSTRACT

An apparatus and method is provided for operating an aircraft control stick in an active mode and a passive mode. The method comprises subjecting the control stick to an a resilient restoring force in the passive mode, and neutralizing the restoring force in the active mode. A spring assembly is provided for exerting and neutralizing the restoring force, which may be varied between minimum and maximum values.

19 Claims, 10 Drawing Sheets

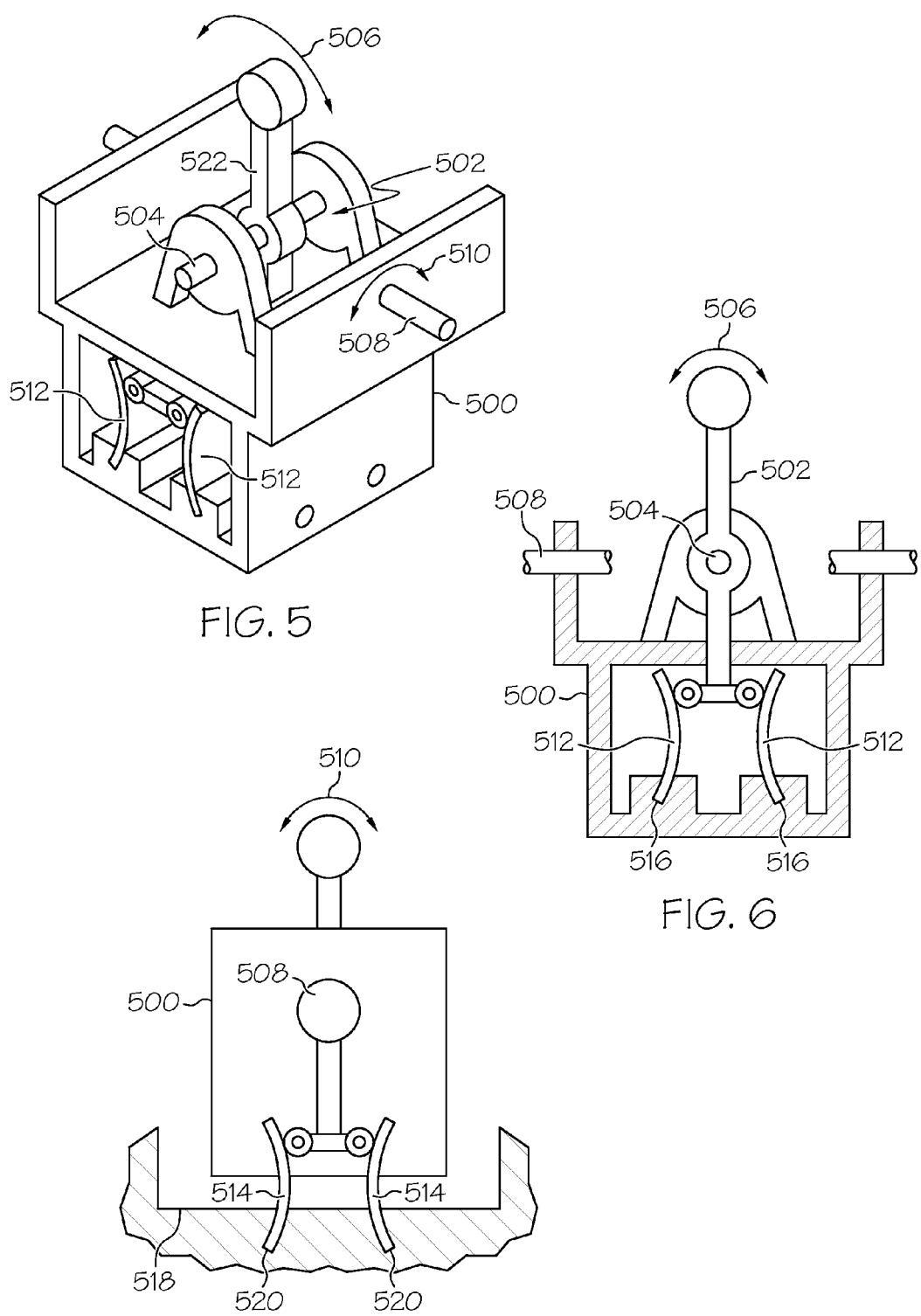

AIRCRAFT CONTROL STICK OPERATIONAL IN ACTIVE AND PASSIVE MODES

FIELD OF THE INVENTION

Embodiments of the subject matter described herein relate generally to an aircraft control stick operable in first and second modes and, more particularly to a method and apparatus for providing an adjustable restoring force to releasably secure an aircraft control stick in a predetermined position in a passive mode and for neutralizing the restoring force for operation in an active mode.

BACKGROUND

On some devices, there is a need to bias a rotatable object toward a predetermined position on its rotational axis. For example, some aircraft flight control systems utilize a gimbal assembly to translate any movements of a flight control stick into the rotation of a plurality of shafts about two rotational axes. These shafts may be biased to a predetermined position to enable the flight control stick to return to a null position when it is released by the pilot or co-pilot.

In this passive mode, a force is required to release the object from the predetermined position, providing physical feedback to the user of the object and indicating to the user that the mechanism is in the predetermined position. Thus, the control stick that is coupled to a gimbal assembly may be releasably secured in its null position by securing each of the shafts in a predetermined position about its axis of rotation, and preventing the control stick from moving unless the pilot or co-pilot applies enough force to allow rotation of one or both of the shafts.

Active control sticks, however, are capable of operation in a passive mode, as above described, and in an active mode that does not require automatic return to the null position. To this end, it is known to utilize centering springs that are configured to return the control stick to its null position when there is no pilot exerted force on the control stick. However, these springs are not required in the active mode, and the presence of these centering springs when operating in the active mode requires the drive motors or electro-mechanical actuators to be larger, complicates the control laws relating to control stick inertia, friction, and force discontinuities, and makes it more difficult to achieve acceptable tactile characteristics in the active mode.

Considering the foregoing, it would be desirable to provide a control stick assembly that may be continuously adjusted between first and second positions so as to operate (1) in the passive mode, utilizing a restoring system, and (2) in the active mode by neutralizing the restoring forces.

Furthermore, other desirable features and characteristics of the present invention will become apparent from the following detailed description taken in conjunction with the accompanying drawings, this Background, and the appended Claims.

BRIEF SUMMARY

In accordance with the above, there is provided an aircraft control stick assembly, comprising a control stick, and a first spring assembly for exerting an adjustable restoring force to releasably secure the control stick in a predetermined position in a first mode and for neutralizing the first restoring force in a second mode.

Also provided is an aircraft control stick assembly, suitable for use in an active mode and a passive mode, comprising a control stick, first and second spring assemblies coupled to the control stick for exerting first and second adjustable restoring forces, respectively, to releasably secure the control stick in a predetermined position in a passive mode, and for removing the first and second restoring forces in an active mode.

A method is also provided for operating an aircraft control stick in an active mode and a passive mode. The method comprises subjecting the control stick to an adjustable resilient restoring force in the passive mode, and neutralizing the restoring force in the active mode.

BRIEF DESCRIPTION OF THE DRAWINGS

The present invention will hereinafter be described in conjunction with the following drawing figures, wherein like numerals denote like elements, and:

FIGS. 5, 6, and 7 are partial isometric, first side, and second side views, respectfully, of a gimbal box assembly utilizing the concepts discussed above, which allows motion in pitch and roll orthogonal axes as is typical for aircraft control;

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
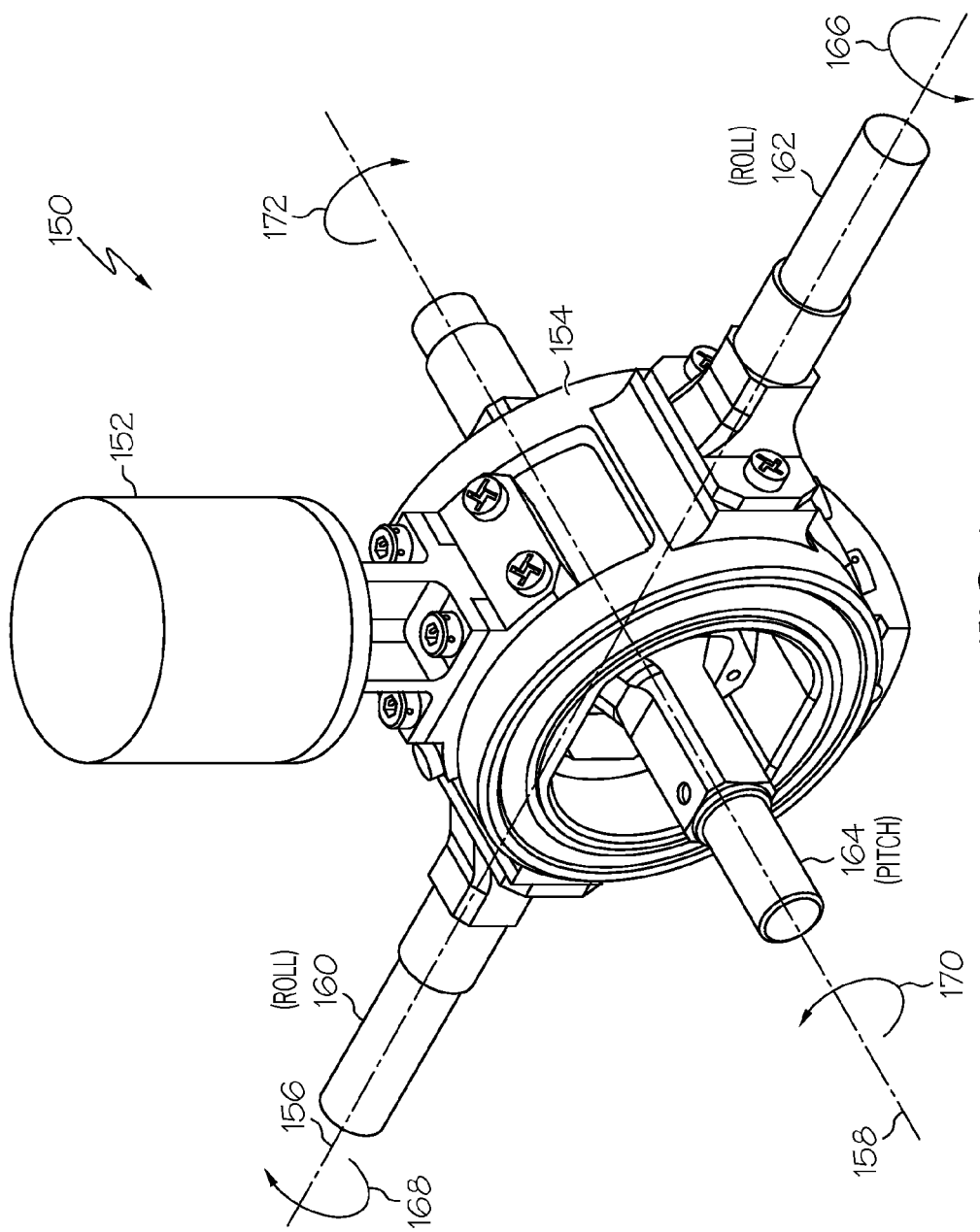
FIG. 1 is an isometric view of an exemplary human-machine interface assembly.

Embodiments of the present invention may be utilized in conjunction with devices that have multiple shafts, to bias the shafts toward, and releasably retain them in, a predetermined position. For example, FIG. 1 depicts an exemplary embodiment of a human-machine interface assembly 150. The human-machine interface assembly 150 includes a user interface 152 and a gimbal assembly 154. The user interface 152 is coupled to the gimbal assembly 154 and is configured to receive an input force from a user. The user interface 152 may be implemented as a grip or control stick that is preferably dimensioned to be grasped by the hand of a user, such as the pilot or co-pilot of an aircraft.

Figure 8:
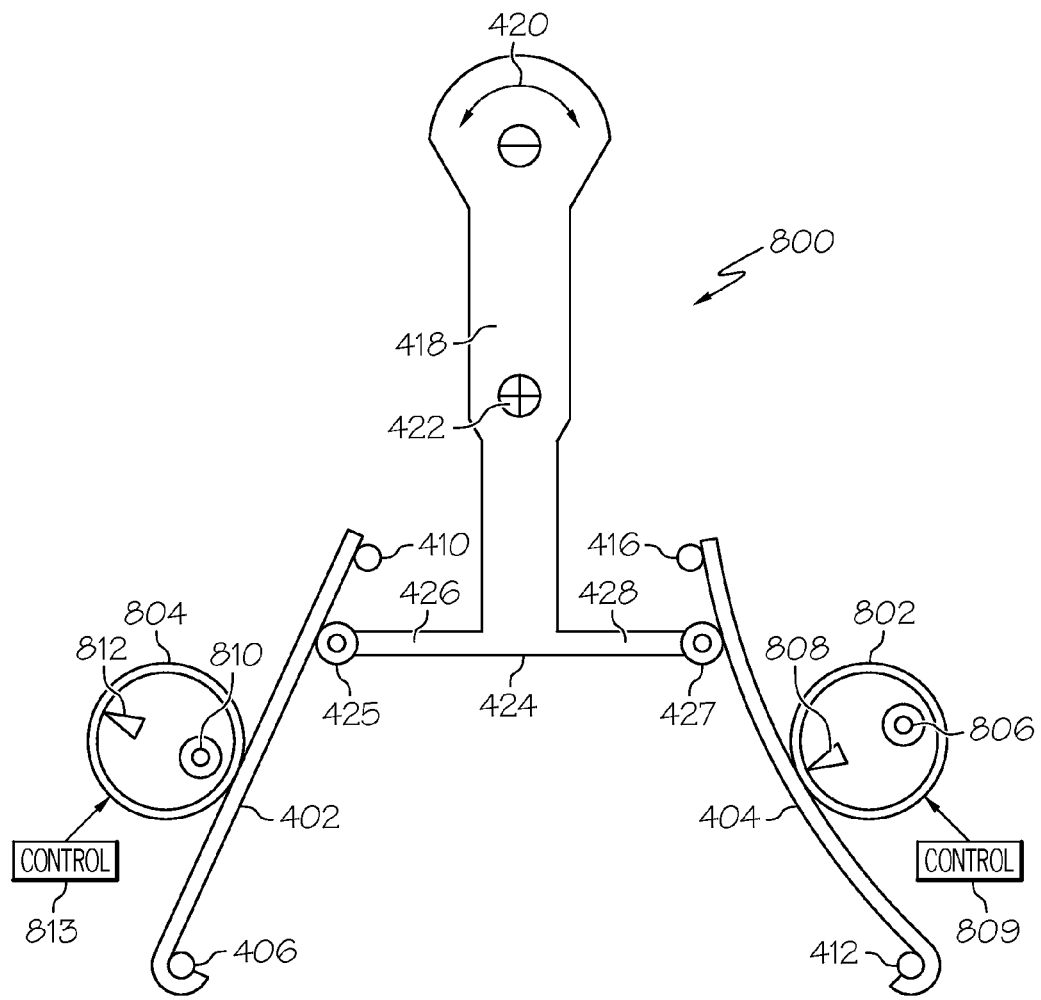
FIG. 8 illustrates a first exemplary embodiment for providing a restoring force to releasably secure an aircraft control stick in a predetermined position in a passive mode and for neutralizing the restoring force for operation in an active mode.

The gimbal assembly 154 is preferably mounted within a suitable, non-illustrated housing assembly, and is configured to allow the user interface 152 to be moved from a null position, which is the position depicted in FIG. 8, to a plurality of control positions in a plurality of directions. More specifically, the gimbal assembly 154, in response to an input force supplied to the user interface 152, allows the user interface 152 to be moved from the null position to a plurality of control positions, about two perpendicular rotational axes (e.g., a first rotational axis 156 and a second rotational axis 158 as shown). It will be appreciated that the human-machine interface assembly 150 may be implemented as an aircraft flight control system, with the user interface 152 functioning as a flight control stick. In such an embodiment, the first and second rotational axes 156, 158 may be referred to as the roll and pitch axes, respectively.

The gimbal assembly 154 includes a first roll shaft 160, second roll shaft 162 and a pitch shaft 164. The first and second roll shafts 160, 162 are each fixably coupled to opposing ends of the gimbal assembly 154, for rotation therewith about the first rotational axis 156. The pitch shaft 164 is coupled to the gimbal assembly 154 for rotation therewith about the second rotational axis 158.

The gimbal assembly 154 is configured to permit the user interface 152 to be movable about the first and second rotational axes 156, 158 and to translate any movement of the user interface 152 into a corresponding rotation of the first and second roll shafts 160, 162 and/or the pitch shaft 164. For example, movement of the user interface 152 about the first rotational axis 156 in the port direction 166 and starboard direction 168 result in a rotation of the gimbal assembly 154 and the first and second roll shafts 160, 162 about the first rotational axis 156. Further, movement of the user interface 152 about the second rotational axis 158 in a forward direction 170 or an aft direction 172, result in the rotation of the gimbal assembly 154 and the pitch shaft 164 about the second rotational axis 158. It will be appreciated that the gimbal assembly 154 is configured to allow the user interface 152 to be moved in a combined forward-port direction, a combined forward-starboard direction, a combined aft-port direction, or a combined aft-starboard direction, and back to or through the null position, resulting in the rotation of the first and second roll shafts 160, 162 about the first rotational axis 156, and the pitch shaft 164 about the second rotational axis 158. It will additionally be appreciated that the gimbal assembly 154 may be configured using any one of numerous gimbal assembly implementations now known.

Figure 3:
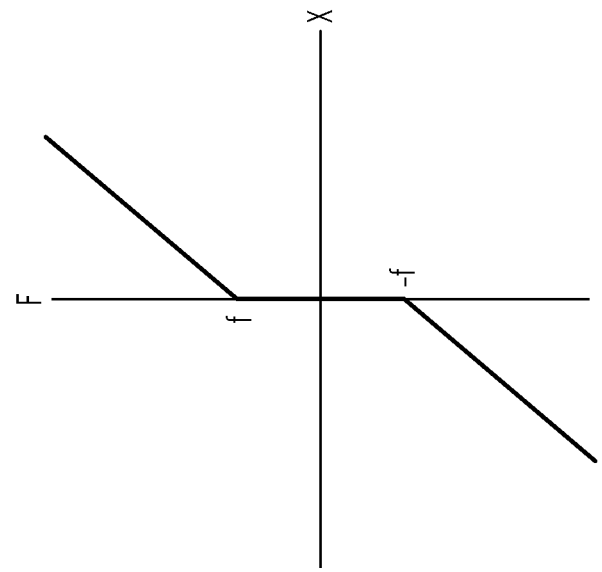
FIGS. 2 and 3 are functional and graphical representations, respectively, of a passive return-to-center control stick arrangement.
Figure 2:
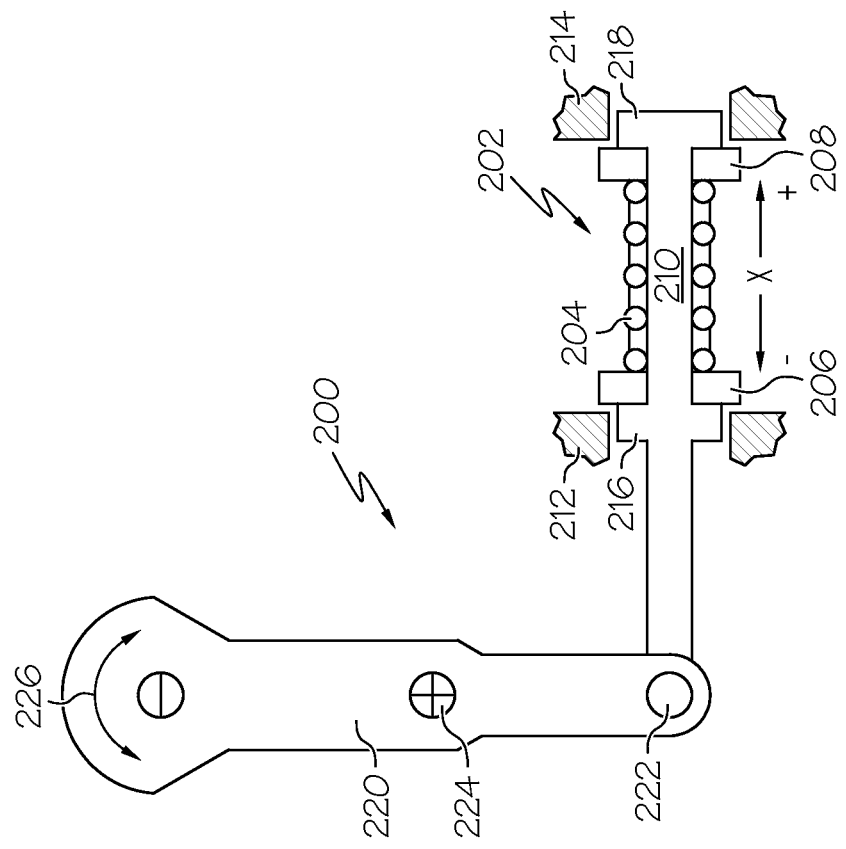

FIGS. 2 and 3 are functional and graphical representations, respectively, of a passive return-to-center control stick arrangement 200 wherein a restoring force is provided by a coil spring assembly 202 comprised of a coil spring 204 compressed between end plates 206 and 208. The spring assembly 202 is mounted for slidable movement on shaft 210 and constrained between fixtures 212 and 214. However, shaft abutments 216 and 218 are free to move through fixtures 212 and 214 respectively. Shaft 210 is pivotally coupled to control stick 220 at pivot 222, and control stick 220 is coupled for rotation about an axis 224. Thus, control stick may be moved clockwise or counterclockwise about axis 224 as is indicated by arrow 226.

It should be appreciated that the pre-compression of spring 204 between abutments 216 and 218 will exert an opposing force of expansion |f| upon fixtures 212 and 214 that resists movement of shaft 210. Before control stick 220 may be rotated either clockwise or counterclockwise a translational force |f| must be exerted on shaft 210. Thus, referring to FIGS. 2 and 3, before control stick 220 may be rotated counter-clockwise, sufficient pressure must be exerted on control stick 220 in the counterclockwise direction to exceed the opposing force of expansion exerted by spring 204. That is, until the opposing force of expansion is exceeded, there will be no linear displacement of shaft 210 in the x direction. After the opposing force is reached, the application of additional force of rotation on control stick 220 will result in linear movement of shaft 210 in the x direction. This is illustrated in FIG. 3 which is a graph of displacement (x) as a function of applied force (F). In a similar fashion, clockwise rotation of control stick 220 will require sufficient pressure to exceed a force on shaft 210 in the opposite direction (−x) after which the displacement (−x) as a function of force (−F) will be substantially linear.

Figure 4:
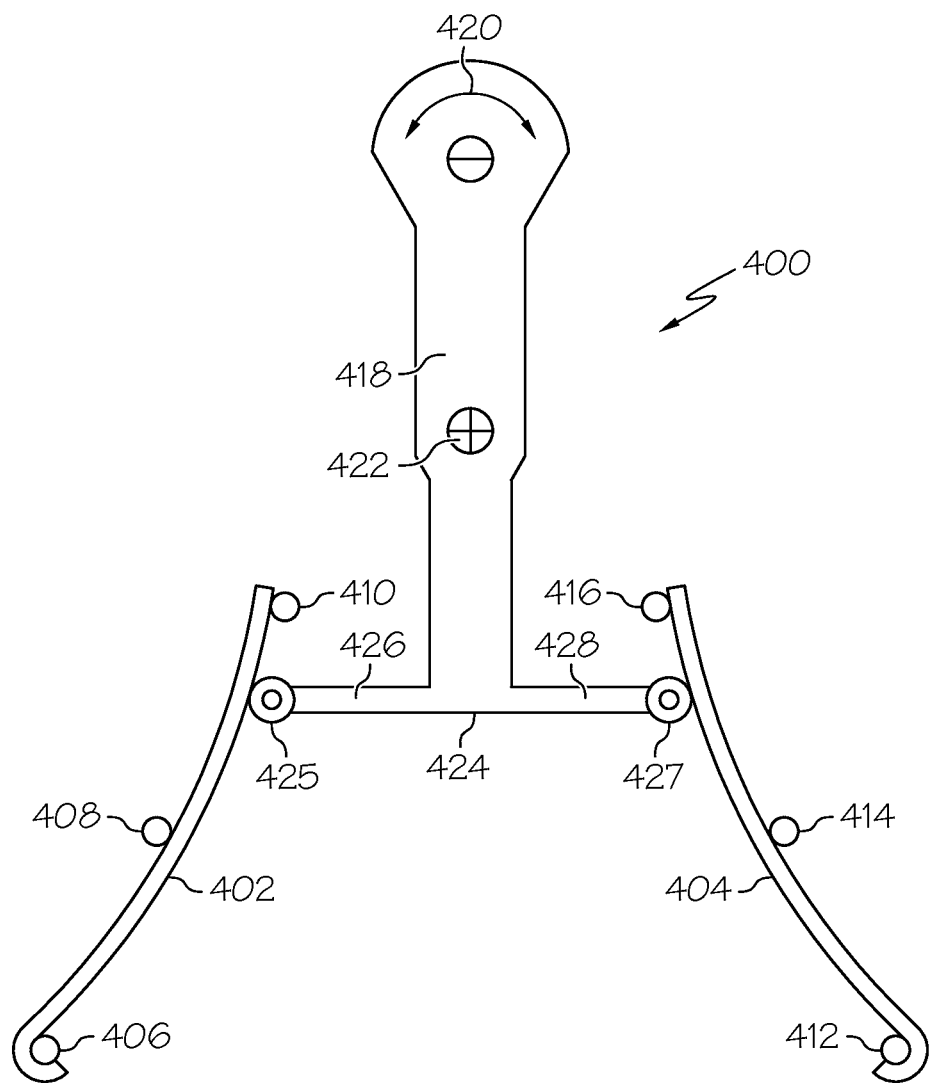
FIG. 4 is a functional representation of another passive, return-to-center control stick arrangement.

FIG. 4 is a functional representation of another passive, rerun-to-center control stick arrangement 400 wherein the restoring force is provided by leaf springs 402 and 404. Leaf spring 402 is maintained in a first stressed position by fixed points 406, 408, and 410, and leaf spring 404 is maintained in a first stressed position by fixed points 412, 414, and 416. Control stick 418 is configured to be rotatable in clockwise and counterclockwise directions (as indicated by arrow 420) about a pivot 422. Control stick 418 terminates with a transverse member 424 having a first leg 426 that rolls or slides along an inner surface of leaf spring 402. Similarly, a second leg 428 has a terminus 427 that rolls or slides along an inner surface of leaf spring 404.

Operationally, if control stick 418 is rotated in a clockwise direction, leaf spring 402 will be deflected off and away from fixed point 410 by leg 426. The resulting energy stored in deflected leaf spring 402 provides the restoring force necessary to return the control stick 418 to its neutral position when it is released. Similarly, when control stick 418 is rotated in a counterclockwise direction, leaf spring 404 is deflected off and away from fixed point 416 by leg 428. The energy stored in the deflected leaf spring is sufficient to provide a restoring force and return control stick 418 to its neutral position when released.

The principles described in connection with FIGS. 1-4 may be utilized to provide a passive mode control stick assembly suitable for controlling aircraft roll and pitch. For example, FIGS. 5, 6, and 7 are partial isometric, first side, and second side views, respectfully, of a gimbal box assembly utilizing the concepts discussed above. Referring to these figures, a gimbal box assembly 500 includes an aircraft control stick assembly 502 that is rotatable about a first axis 504 (the roll axis) as indicated by arrows 506, and a second axis 508 (the pitch axis) as indicated by arrows 510. The gimbal box assembly comprises first and second pairs of leaf springs 512 and 514 of the type previously described in connection with FIG. 4. As can be seen, leaf springs 512 are anchored in the gimbal box housing as is shown at 516 in FIG. 6, and leaf springs 514 are anchored in an external housing 518 as is shown at 520.

Leaf spring pairs 512 and 514 each provide a restoring force of the type described above. That is, at any given pitch and/or roll (other than null), the forces exerted on control stick 522 by spring pairs 512 and 514 will urge control stick 522 to its null position as described above.

As alluded to previously, it is contemplated that embodiments described herein provide a control stick assembly that may be operated in a passive mode utilizing a return-to-center restoring force, and in the active mode wherein the restoring force may be substantially eliminated or at least significantly reduced. FIG. 8 illustrates such an arrangement wherein like elements are denoted with like reference numerals.

Once again, a control stick 418 is configured to be rotatable in clockwise and counterclockwise directions (as indicated by arrow 420) about a pivot 422. Control stick 418 terminates with a transverse member 424 having a first leg 426 having a terminus 425 that rolls or slides along an inner surface of leaf spring 402. Similarly, a second leg 428 has a terminus 427 that rolls or slides along an inner surface of leaf spring 404. Leaf spring 402 is restrained, in part, by fixed points 406 and 410, and leaf spring 404 is restrained, in part, by fixed pins 412 and 416.

In the embodiment shown in FIG. 8, however, fixed pin 414 (FIG. 4) has been replaced by eccentric cam assembly 802 having an off-center axis of rotation 806 and, if desired, a marker 808. In the same manner, fixed pin 408 (FIG. 4) has been replaced by eccentric cam assembly 804 having an off-center axis of rotation 810 and, if desired, a marker 812.

For purposes of illustration only, cam assembly 802 is positioned to stress spring 404 and thus provide an adjustable restoring force to control stick 418 via leg 428 as previously described. Cam assembly 804, in contrast, is positioned so as to permit spring 402 to remain in an unstressed condition; thus, leaf spring 402 will not provide a restoring force to control stick 418. It should be clear that in practice, cam assemblies 802 and 804 will both be in either the restoring position or the non-restoring position. Thus, the system may be operating the passive mode (i.e. the restoring mode) or the active mode (i.e. the non-restoring mode). It should be clear that transitioning between these modes may be accomplished by adjusting cam assemblies 802 and 804; e.g. electronically or mechanically. It should also be noted that the restoring force may be adjusted by positioning the cams in an intermediate position.

Figure 10:
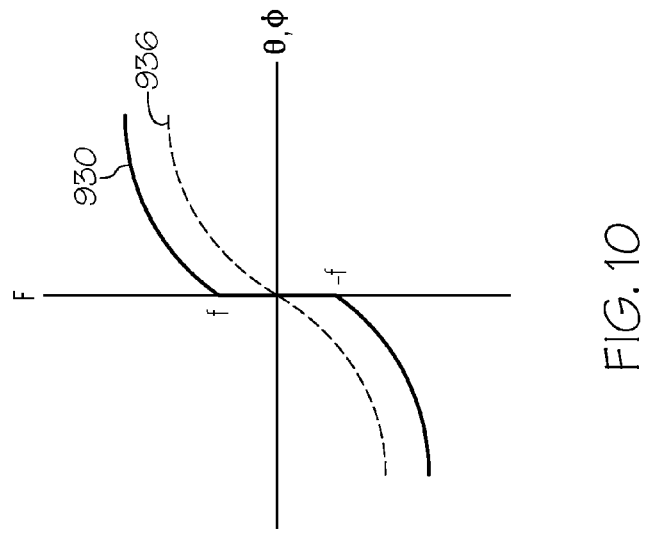
FIGS. 9 and 10 are functional and graphical representations, respectively, of a second exemplary embodiment for providing an adjustable restoring force to releasably secure an aircraft control stick in a predetermined position in a passive mode and for neutralizing the restoring force for operation in an active mode.
Figure 9:
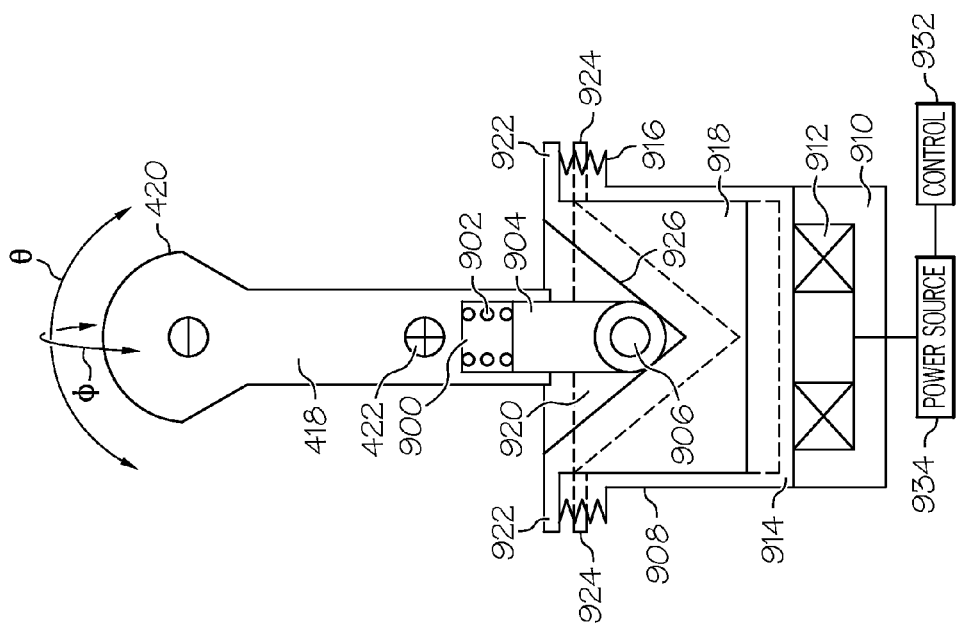

FIGS. 9 and 10 illustrate yet another embodiment of a control stick assembly that may be operated in (1) a passive mode utilizing an adjustable return-to-center restoring force, and (2) in an active mode wherein the restoring force may be neutralized. Once again, like elements are denoted with like reference numerals. Control stick 418 includes a channel 900 therein that houses (1) a spring 902 and (2) a first end of a post 904 slidable mounted in channel 900. The second end of post 904 is coupled to a roller-ball assembly 906 that may freely rotate in any direction. A first housing 908 (e.g. substantially circular in cross-section) includes (1) a lower portion 910 that houses a solenoid 912 and (2) an upper hollow section 914 including an upper, outwardly extending rim 916. A second housing 918 is slidably received within the first housing 908 and includes a conical cavity 920 in an upper surface thereof that receives, to a greater or lesser extent as will be described below, roller-ball assembly 906. Housing 918 likewise includes an upper, outwardly extending circular rim 922 that resides above rim 916 of housing 908.

A resilient assembly (e.g. a spring) 924 is coupled between rims 916 and 922 and is chosen, along with spring assembly 902, to assure that roller ball 906 remains in contact with the surface 926 of cavity 920 when the control stick assembly is being operated in the passive mode. In this manner, post 924, and therefore control stick 418,| are biased toward center. That is, as control stick 418 is moved off center and upward on conical wall 926, spring assembly 902 is compressed thus creating a restoring force that returns the control stick to the center position when the control stick 418 is released. Thus, an initial force |f| is required to initially move control stick 418 that corresponds to the preloaded force stored in spring assembly 902 after which the control stick 418 may be moved. This is represented by curve 930 in FIG. 10 and corresponds to a passive mode of operation.

When active mode operation is desired, a control 932 coupled to power source 934 is activated. Power source 934 is coupled to a switch such as a solenoid 912 which, when activated, draws housing 918 downward overcoming the force of spring assembly 924 and to a position beyond the reach of conical surface 926. In this mode (i.e. the active mode), spring assembly is no longer compressed and no restoring force is generated. Operation is then characterized by curve 936 in FIG. 10 (i.e. zero restoring force). Thus, there has been provided a control stick assembly that may be operated in a passive mode utilizing a return-to-center restoring force, and in the active mode wherein the restoring force may be substantially eliminated or at least significantly reduced.

Figure 12:
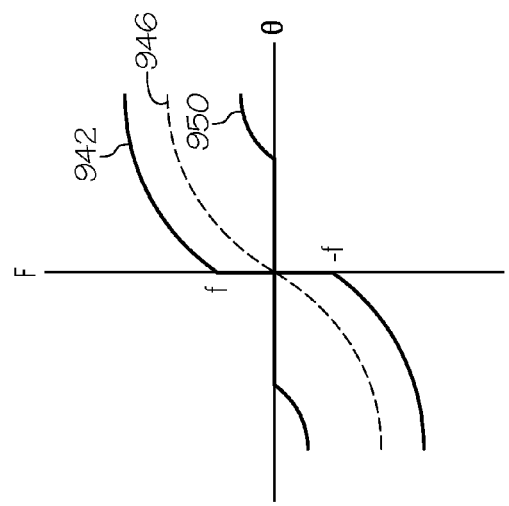
FIGS. 11 and 12 are functional and graphical representations, respectively, of a third exemplary embodiment for providing an adjustable restoring force to releasably secure an aircraft control stick in a predetermined position in a passive mode and for neutralizing the restoring force for operation in an active mode.
Figure 11:
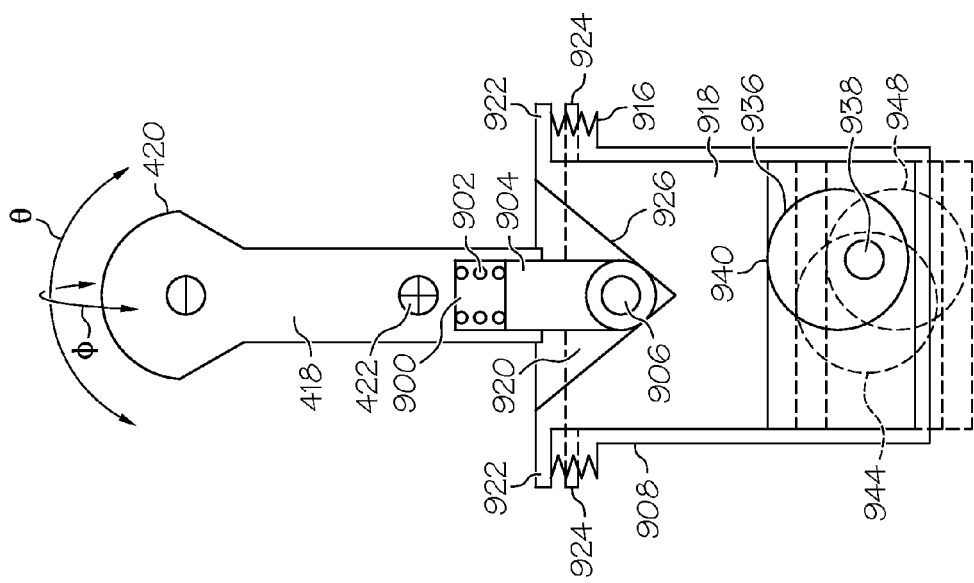
Figure 13:
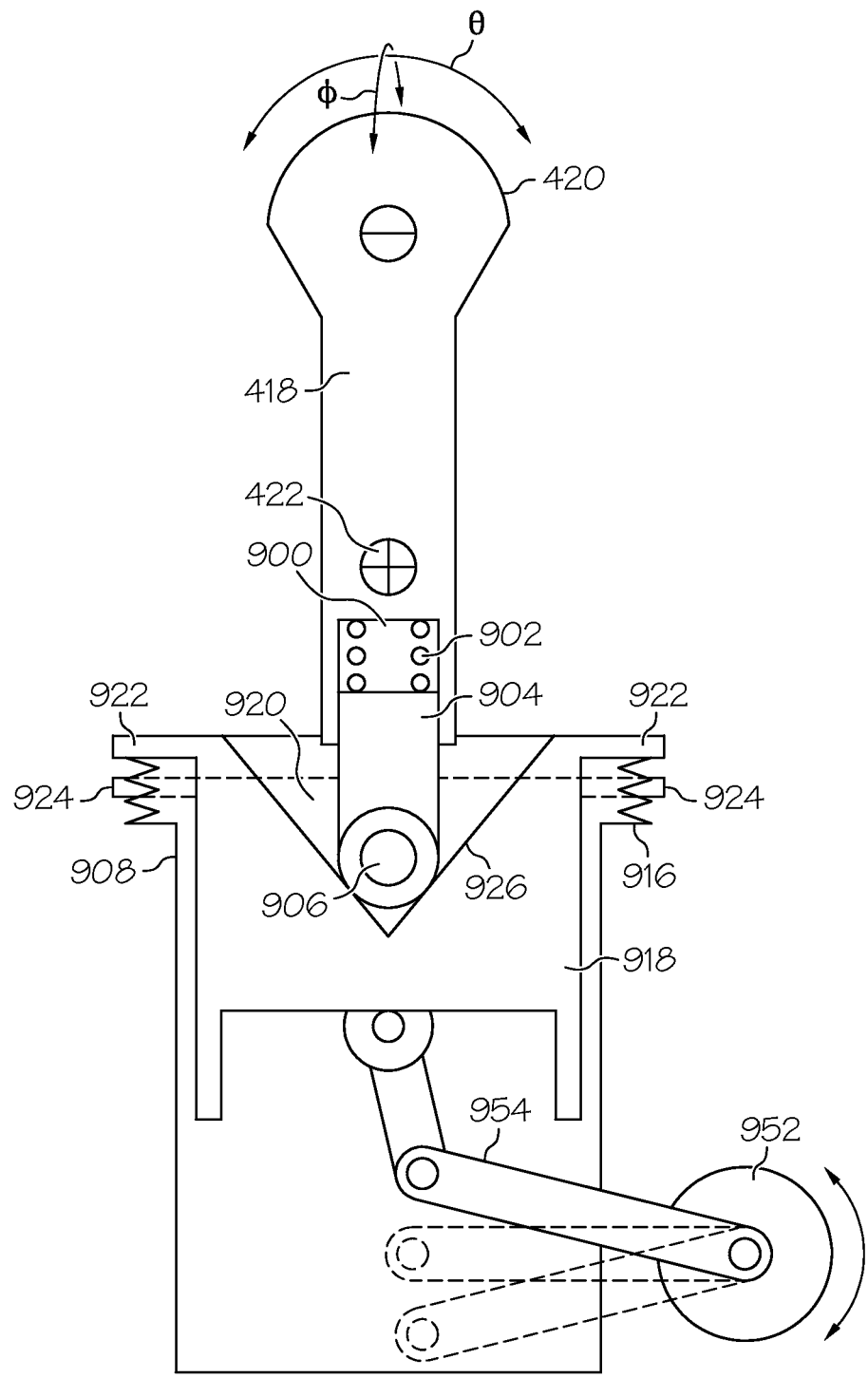
FIGS. 13, 14, and 15 are functional representations of fourth, fifth, and sixth exemplary embodiments for providing an adjustable restoring force to releasably secure an aircraft control stick in a predetermined position in a passive mode and for neutralizing the restoring force for operation in an active mode.
Figure 14:
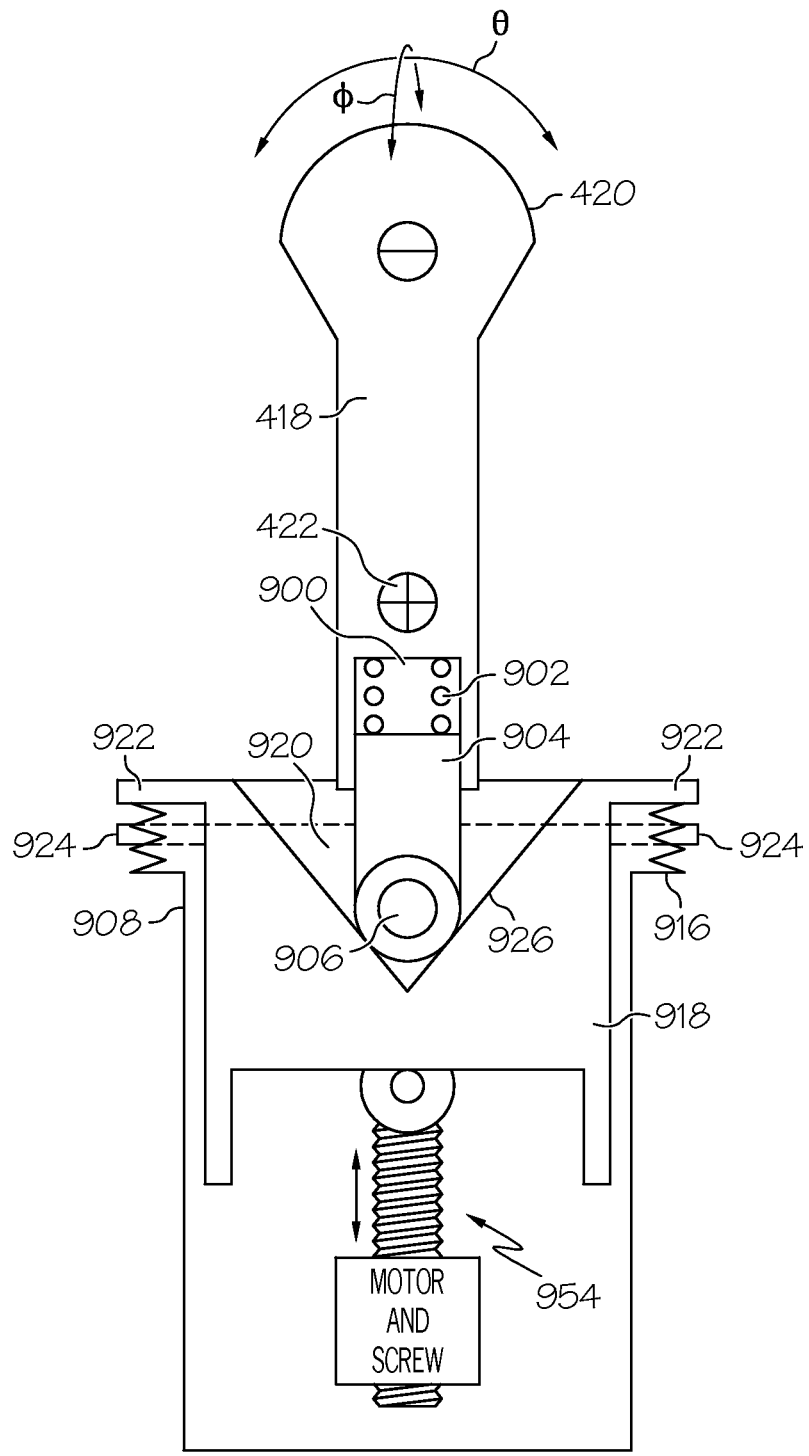

FIGS. 11 and 12 illustrate yet another embodiment of a control stick assembly that may be operated in (1) a passive mode utilizing an adjustable return-to-center restoring force, and (2) in an active mode wherein the restoring force may be neutralized. Once again, like elements are denoted with like reference numerals. In this embodiment, however, the restoring force may be adjusted continuously or in discreet increments between a predetermined minimum (including zero) and a predetermined maximum. For example, a cam assembly 936 (e.g. motorized or manually adjustable) is rotatable around axis 938 and is coupled to a lower portion of housing 918 at 940. When cam 936 is positioned as shown at shown solid line, spring 902 is compressed, thus creating a restoring force that returns the control stick to the center position when the control stick 418 is released. Thus, an initial force |f| is required to initially move control stick 418 that corresponds to the preloaded force stored in spring assembly 902 after which the control stick 418 may be moved. This is represented by curve 942 in FIG. 12 and corresponds to a passive mode of operation. As cam 936 is rotated to position 944, spring 902 expands to an uncompressed state. There is no longer a restoring force, and the force characteristic is as shown by curve 946 in FIG. 12. As cam 936 is further rotated to position 948, housing 918 is lowered further, and roller ball 906 disengages from the surface 926. However, as control stick 418 pivots, roller ball may again engage cavity surface 926. The force characteristic will then appear as curve 950 in FIG. 12, which indicates no force until roller ball 906 engages cavity surface at an upper region thereof. Of course, housing 918 may be lowered sufficiently such that roller ball 906 of control stick 418 does not engage surface of cavity 920 at all; i.e. the active mode. In FIG. 13, housing 918 is shown as being raised and lowered by a motor 952 and linkage assembly 954, whereas in FIG. 14, a motor and screw assembly 954 raises and lowers housing 918.

Figure 15:
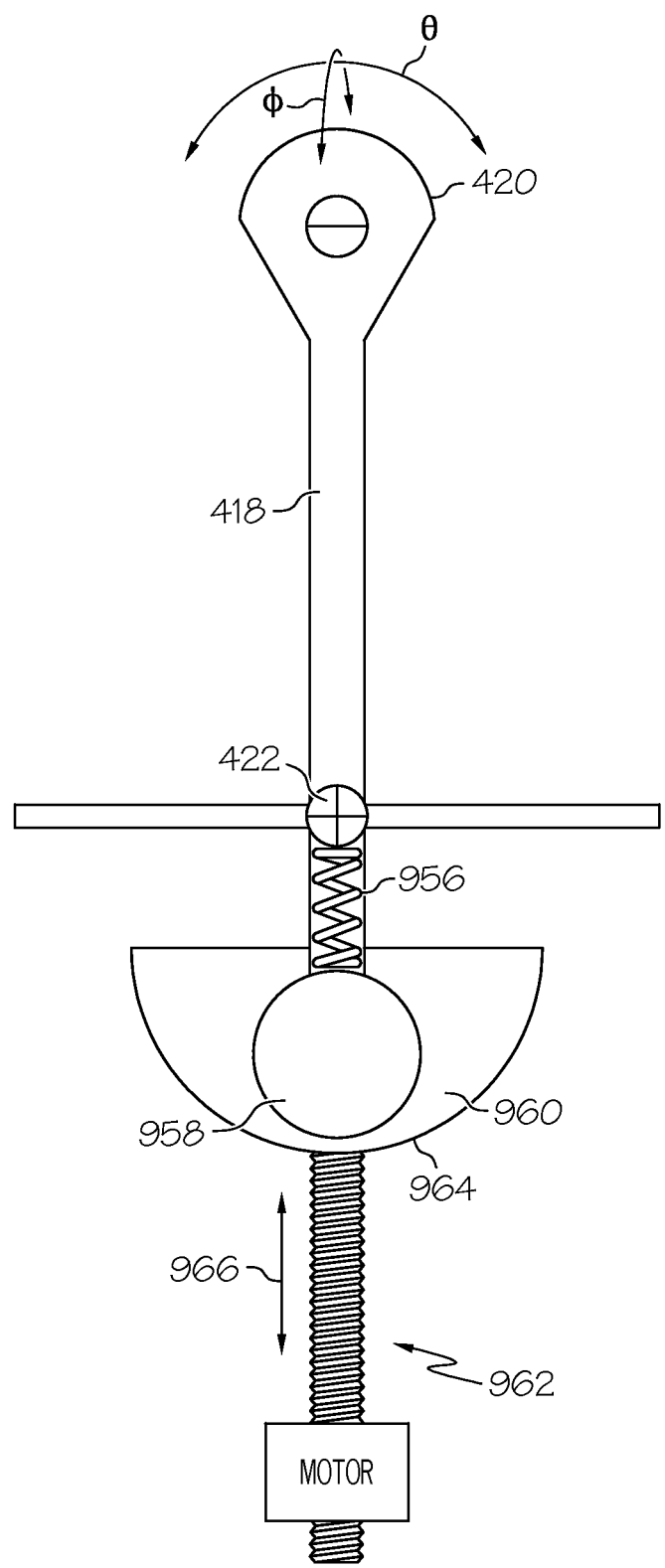

FIG. 15 illustrates yet another embodiment of a control stick assembly that may be operated in (1) a passive mode utilizing a return-to-center restoring force, and (2) in an active mode wherein the restoring force may be neutralized. Once again, like elements are denoted by like reference numerals. A spring 956 spring loads a roller ball 958 that is configured to engage and roll along the inner surface of a spherical cavity 960. A linear screw drive 962 is configured to move cavity 960 into and out of abutment with the surface 964 as is indicated by arrow 966. Moving surface 964 up and down changes the preload on spring 956, which is now shown in the unloaded state. The radius of spherical surface 960 is less than the radius of the path of the unloaded roller ball 960 as it is caused to rotate about pivot 422. Thus, cavity 960 may be lowered to a point where it does not engage surface 964, and therefore no restoring force is created for operation in the active mode. As cavity 960 is raised, roller ball 958 will increasingly engage surface 964 creating an increasing restoring force as spring 956 is further compressed.

In view of the above, there has been provided several embodiments of a control stick assembly that may be continuously adjusted between first and second positions so as to operate (1) in the passive mode, utilizing a restoring force generating system, and (2) in the active mode by neutralizing the restoring force.

While at least one exemplary embodiment has been presented in the foregoing detailed description, it should be appreciated that a vast number of variations exist. For example, various biasing techniques and methodologies may be utilized to achieve the desired objectives. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft control stick assembly, comprising:
   a control stick; and
   a first spring assembly for exerting a first adjustable restoring force to releasably secure the control stick in a predetermined position in a first mode; and
   a first cam assembly cooperating with the first spring assembly for neutralizing the first adjustable restoring force in a second mode.

2. An assembly according to claim 1 further comprising a second spring assembly coupled to the control stick assembly for exerting a second adjustable restoring force to releasably secure the control stick in the predetermined position in the first mode and for neutralizing the second adjustable restoring force in the second mode.

3. An assembly according to claim 2 wherein the restoring force generated by the first spring assembly is associated with the pitch of the aircraft and the restoring force generated by the second spring assembly is associated with the roll of the aircraft.

4. An assembly according to claim 3 wherein the first and second spring assemblies are preloaded to exert the first and second restoring forces, respectively.

5. An assembly according to claim 4 wherein the first spring assembly comprises first and second leaf springs configured to be preloaded in at least first and second different directions.

6. An assembly according to claim 5 wherein the second spring assembly comprises third and fourth leaf springs configured to be preloaded in at least third and fourth different directions.

7. An assembly according to claim 6 wherein the first and second spring assemblies cooperate to return the control stick to the predetermined position when the control stick is released.

8. An assembly according to claim 7 further comprising a wherein the first cam assembly engaging is configured to engage the first and second leaf springs.

9. An assembly according to claim 8 further comprising a second cam assembly engaging the third and fourth leaf springs.

10. An assembly according to claim 7 further comprising first and a second rotatable cam in engagement with the first and second leaf spring respectively, each capable and adjustable between first and second positions, the first position corresponding to a preload position for generating a restoring force and the second position for reducing the restoring force.

11. An assembly according to claim 10 further comprising third and fourth rotatable cams in engagement with the third and fourth leaf springs, respectively, each of the third and fourth cams adjustable between first and second positions, the first position corresponding to a preload position for generating a restoring force and the second position for removing the reducing force.

12. An assembly according to claim 1 wherein the first spring assembly comprises:
    a spring loaded piston extending from the control stick;
    a first housing having a cavity therein for receiving the spring loaded piston therein;
    a second housing for receiving the first housing therein;
    a first spring assembly for biasing the first housing to a position wherein the spring loaded piston engages the cavity to produce a restoring force when the control stick is moved from a center position; and
    a switch for drawing the first housing further into the second housing and out of contact with the piston.

13. An assembly according to claim 12 wherein the cavity is conical.

14. An assembly according to claim 12 wherein the cavity is spherical.

15. An assembly according to claim 12 wherein the actuator is a cam assembly.

16. An assembly according to claim 12 wherein the actuator is a motor driven screw assembly.

17. An aircraft control stick assembly, suitable for use in an active mode and a passive mode, comprising:
    a control stick;
    first and second spring assemblies coupled to the control stick for exerting first and second adjustable restoring forces, respectively, to releasably secure the control stick in a predetermined position in a passive mode; and
    a first and second rotatable cam assembly coupled to the first spring assembly and second spring assembly, respectively, for neutralizing the first and second restoring forces in an active mode.

18. An assembly according to claim 17 wherein the first spring assembly comprises first and second leaf springs and the second spring assembly comprises third and fourth leaf springs, the first, second, third, and fourth leaf springs preloaded to return the control stick to the predetermined position.

19. An assembly according to claim 18 further comprising first, second, third and fourth rotatable cams coupled to the first, second, third and fourth leaf springs, respectively, each capable of assuring a first position corresponding to a preload position for generating a restoring force, and a second position for removing the restoring force.

* * * * *